US006953279B2

(12) United States Patent
Midas et al.

(10) Patent No.: US 6,953,279 B2
(45) Date of Patent: Oct. 11, 2005

(54) PAINT MIXER WITH DAMPING FRAME

(75) Inventors: Thomas J. Midas, Oak Park Heights, MN (US); Aaron Curtis, Eagan, MN (US)

(73) Assignee: Red Devil Equipment Company, Plymouth, MN (US)

( * ) Notice: Subject to any disclaimer, the term of this patent is extended or adjusted under 35 U.S.C. 154(b) by 0 days.

(21) Appl. No.: 10/348,477

(22) Filed: Jan. 21, 2003

(65) Prior Publication Data

US 2004/0141412 A1 Jul. 22, 2004

(51) Int. Cl.[7] .............................................. B01F 11/00
(52) U.S. Cl. ...................................................... 366/217
(58) Field of Search ................................ 366/208–219, 366/605, 110–111, 114

(56) References Cited

U.S. PATENT DOCUMENTS

| | | | | |
|---|---|---|---|---|
| 2,636,719 A | * | 4/1953 | O'Connor ........................ | 74/61 |
| 3,679,184 A | * | 7/1972 | Woodham et al. ........... | 366/219 |
| 3,778,033 A | * | 12/1973 | Pullman ........................ | 366/219 |
| 3,877,178 A | * | 4/1975 | Campanelli .................. | 451/327 |
| 4,125,335 A | * | 11/1978 | Blume et al. ................ | 366/209 |
| 4,235,553 A | * | 11/1980 | Gall ............................ | 366/208 |
| 4,422,768 A | * | 12/1983 | Solomon ..................... | 366/110 |
| 4,497,581 A | * | 2/1985 | Miller ......................... | 366/208 |
| 4,619,532 A | * | 10/1986 | Schmidt, III ................ | 366/110 |
| 4,728,197 A | * | 3/1988 | Reinhard ..................... | 366/219 |
| 4,828,394 A | * | 5/1989 | Andrews ..................... | 366/110 |
| 4,834,548 A | * | 5/1989 | Tempel et al. ............... | 366/208 |
| 5,352,037 A | * | 10/1994 | Jouvin ......................... | 366/219 |
| 5,551,779 A | * | 9/1996 | Gantner et al. ............. | 366/217 |
| 5,746,510 A | * | 5/1998 | Mark et al. .................. | 366/217 |
| 6,579,002 B1 | * | 6/2003 | Bartick et al. .............. | 366/112 |
| 6,817,751 B2 | * | 11/2004 | Huckby et al. .............. | 366/217 |
| 2003/0107949 A1 | * | 6/2003 | Huckby et al. ............. | 366/217 |
| 2003/0142583 A1 | * | 7/2003 | Santospago et al. ........ | 366/209 |
| 2003/0179646 A1 | * | 9/2003 | Miller ......................... | 366/217 |
| 2003/0214878 A1 | * | 11/2003 | Huckby ....................... | 366/217 |
| 2004/0085855 A1 | * | 5/2004 | Midas et al. ................ | 366/209 |
| 2004/0141412 A1 | * | 7/2004 | Midas et al. ................ | 366/217 |

FOREIGN PATENT DOCUMENTS

| | | | |
|---|---|---|---|
| JP | 10-43567 | * | 2/1998 |
| JP | 10-43568 | * | 2/1998 |
| JP | 11-226375 | * | 8/1999 |
| JP | 2000-84388 | * | 3/2000 |
| JP | 2000-176268 | * | 6/2000 |
| JP | 2000-271465 | * | 10/2000 |
| JP | 2001-246236 | * | 9/2004 |

OTHER PUBLICATIONS

Technical Section: Vibration and Shock: Tech Products Corporation, a Fabreeka Company; Aug. 5, 2002; http://www.tpedayton.com/vibration/techdata/technica.htm; 7 pages.
Selecting the Right Vibro–Insulator; Vibro–Insulators; Aug. 5, 2002: http://www.karman.comselectvibro.cfm; 3 pages.
A Guide to Vibration Isolation; Warden Fluid Dynamics, Guide to Vibration Isolation; Jul. 8, 2002; http://www.wfdonline.comtech_vibrate.htm.
Figures relating to Vibration and Shock: Tech Products Corporation, a Fabreeka Company; Aug. 5, 2002: http:./www.tpedayton.com/vibration/techdata/technica.htm; 7 pages.

* cited by examiner

*Primary Examiner*—Charles E. Cooley
(74) *Attorney, Agent, or Firm*—Faegre & Benson LLP

(57) ABSTRACT

A paint mixing machine having at least two axes for spinning either of a cylindrical or rectangular paint container to mix the paint in the container. The machine includes a stationary base frame carrying a mixing apparatus and an intermediate frame between the stationary base frame and the mixing apparatus. The intermediate frame is connected to the mixing apparatus and the stationary base frame by a plurality of vibration isolators. The intermediate frame includes damping weight to balance the deflection of the damping isolators. The base may also include one or more damping weights.

21 Claims, 10 Drawing Sheets

PAINT MIXER WITH DAMPING FRAME

BACKGROUND OF THE INVENTION

The present invention relates to the field of paint mixing, particularly machines for mixing paint in retail-sized containers, most particularly to those machines which spin the paint container on more than one axis.

In the past, paint has been uniformly sold in the United States at the retail level in one gallon cylindrical cans or containers. Certain prior art paint mixers were designed for mixing custom colors of paint in such one gallon cylindrical containers, using both orbital and spinning motion with the cylindrical container held at an angle during paint mixing operation. Recently paint has become available in a square or rectangular shaped polymer container which has a handle molded integrally into one corner of the container for the painter's convenience in pouring paint from the rectangular container. This new design of paint container results in a significant imbalance (because of the void created with the molded handle) when the paint container is subject to the orbital and spinning motion desirable for paint mixing. When prior art mixers were attempted to be used with the rectangular paint container, unacceptable vibration resulted.

The present invention is useful to mix paint in such rectangular paint containers as well as in conventional cylindrical paint cans. The present invention overcomes the unacceptable vibration observed with rectangular containers during the orbital and spinning motion desirably used to mix paint, while still retaining the ability to mix paint in traditional cylindrical metal paint cans or containers.

SUMMARY OF THE INVENTION

In accordance with the present invention, and apparatus is provided for vortex motion paint mixing machine of the type having a paint container holder spinning about its own axis and orbiting about a second axis positioned at an angle to the container axis, where the machine includes a base and a paint mixing apparatus having a drive mechanism to spin and orbit the paint container. The improvement in combination with the paint mixing machine includes an intermediate frame assembly located between the mixing apparatus and the base and secured therabetween by a plurality of vibration isolators. Also in accordance with the present invention, a method is provided for damping vibration in a paint mixing machine of the type capable of mixing paint in cylindrical or non-cylindrical containers. The method includes providing a receptacle for receiving one of a cylindrical and non-cylindrical paint container on a mixing apparatus; driving the receptacle with a spinning motion about an axis of the receptacle, and an orbiting motion about an axis separate from the axis of the receptacle; providing an intermediate frame between the mixing apparatus and a base; damping vibration between the intermediate frame and the mixing apparatus by a first vibration isolation system, and damping vibration between the intermediate frame and the base by a second vibration isolation system, such that vibration in the base caused by the paint container is reduced by the intermediate frame and the first and second vibration isolation systems.

DETAILED DESCRIPTION

Figure 1:
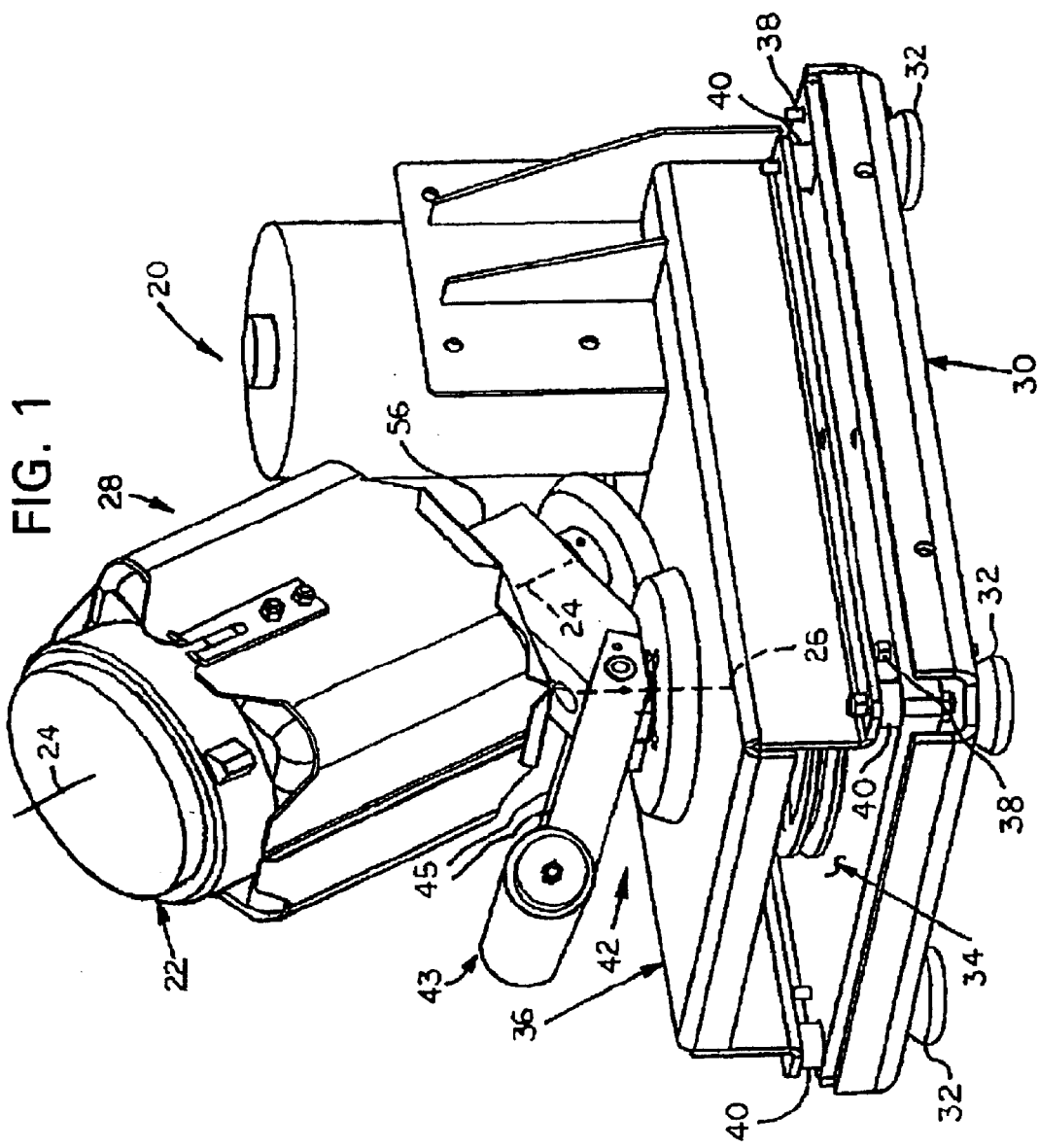
FIG. 1 is a perspective view of a paint mixing apparatus useful in the practice of the present invention.
Figure 2:
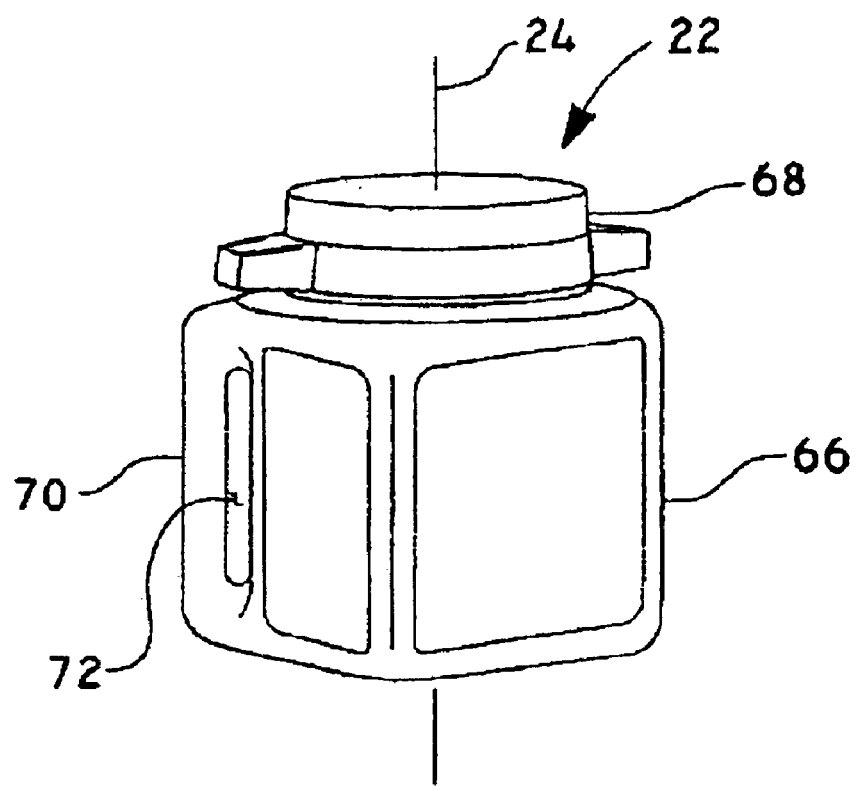
FIG. 2 is a perspective view of a rectangular paint container for use with the apparatus of the present invention to mix paint.
Figure 3:
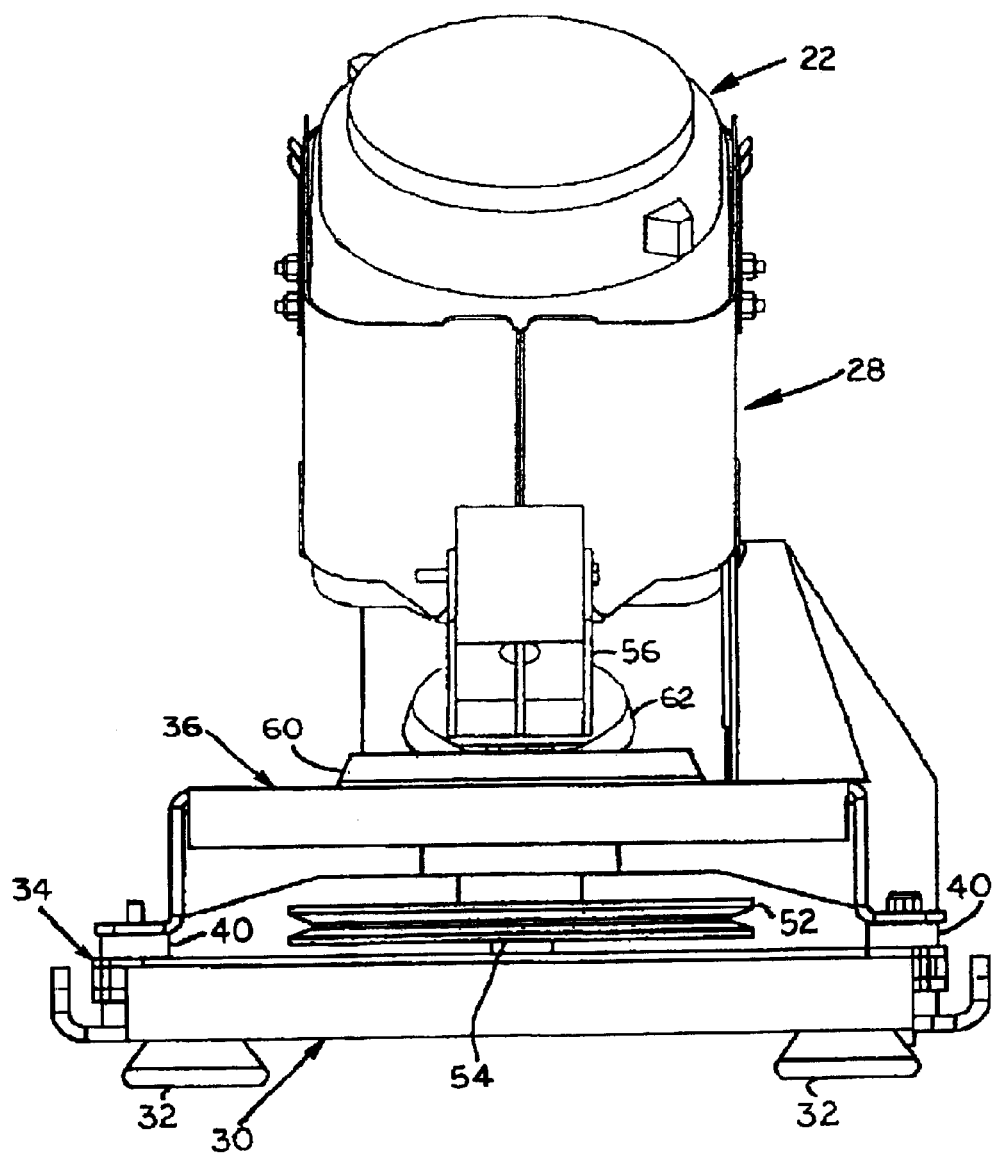
FIG. 3 is a front view of the mixing apparatus of FIG. 1.

Referring to the Figures, and most particularly to FIGS. 1 and 3, a paint mixing machine or mixer 20 according to the present invention may be seen. Although not completely shown, it is to be understood that an enclosure is customarily provided to surround and fully enclose the mixer 20 shown in the drawings. The enclosure has a door for access to allow a user to insert and remove a paint container for mixing, and the mixer also preferably includes a door interlock switch and a timer, neither of which are shown herein. Mixer 20 rotates a paint container 22 about a first axis 24 (which is a central axis of the paint container), and planetates or orbits paint container 22 about a second axis 26. Paint container may be a conventional one gallon cylindrical paint can (not shown) or it may be a rectangular or square paint container 22, shown separately in FIG. 2. Mixer 20 has a paint container holder subassembly 28 (shown in an exploded view in FIG. 4). Holder 28 is arranged to be able to hold either a conventional cylindrical one gallon paint can or the rectangular paint container 22. It is to be understood that other forms of the holder may be used in the practice of the present invention, to accommodate other forms of paint containers, while still retaining the ability to mix prior cylindrical paint containers with such other forms of paint containers as may be desired.

Mixer 20 also has a base 30 supported by a plurality of feet 32, an intermediate frame 34, and a mixing frame or apparatus 36. Mixing apparatus 36 is supported on the intermediate frame 34 by a first plurality of vibration isolators 40, more readily observed in FIG. 10. Intermediate frame 34 is supported on the base 30 by a second plurality of vibration isolators 38.

Figure 7:
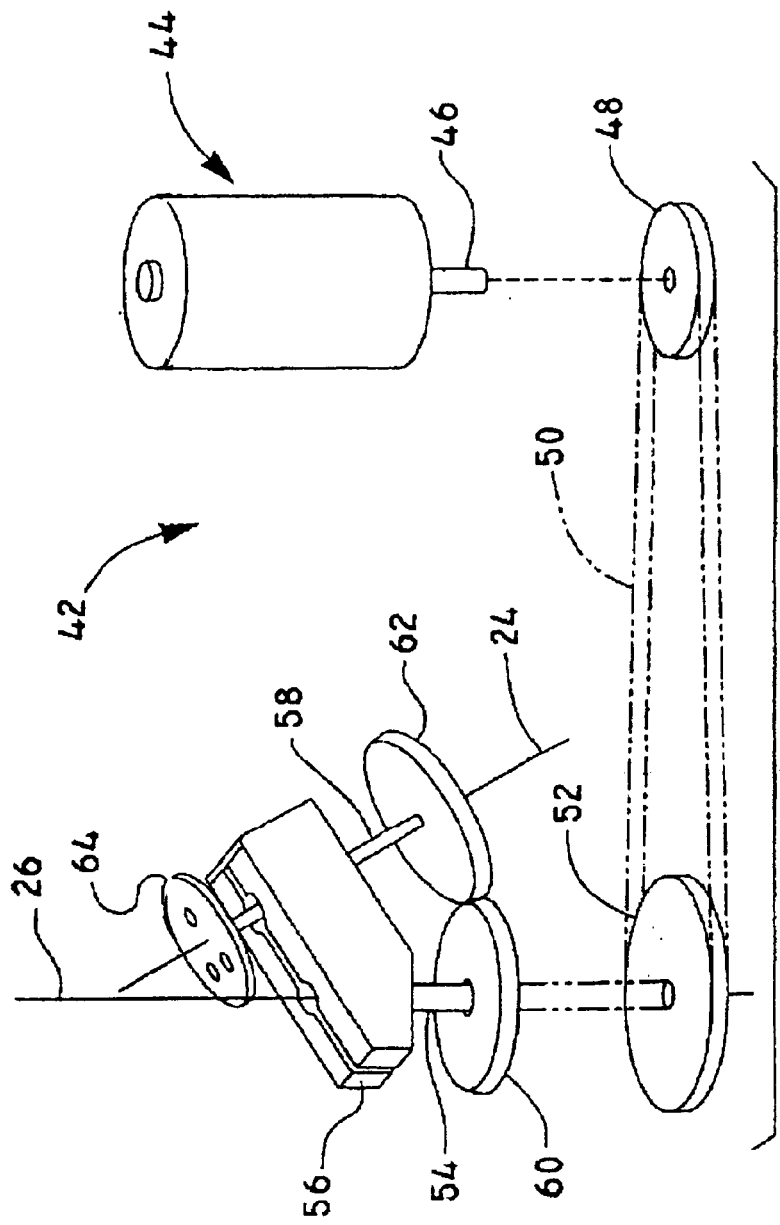
FIG. 7 is an exploded view of the driving mechanism of the mixing apparatus of FIG. 1.
Figure 8:
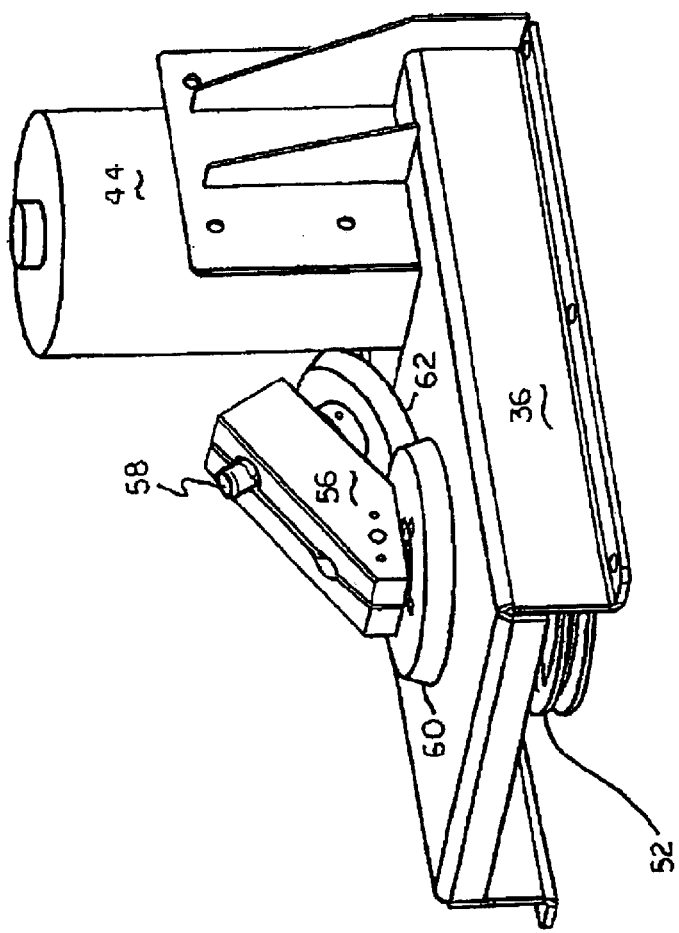
FIG. 8 is a view of a mixing frame carrying the driving mechanism of FIG. 7 and useful in the practice of the present invention.

Mixing frame 36 supports a driving mechanism 42 for the mixer 20. Referring also to FIGS. 7 and 8, driving mechanism 42 includes an electric motor 44 having an output shaft 46, a driving pulley 48, a drive belt 50 (shown in phantom), a driven pulley 52, and a driven shaft 54 rigidly connected to an angled arm 56. In addition, driving mechanism 42 includes a planet gear shaft 58 journaled for rotation in arm 56, and carrying a planet gear 62 and a paint container holder support 64 for rotation therewith. A sun gear 60 surrounds shaft 54 and is fixed to mixing frame 36 such that sun gear 60 does not rotate, it being understood that shaft 54 is journaled for rotation with respect to gear 60. In operation, motor 44 rotates shaft 54 via pulleys 48 and 52 and belt 50, turning arm 56 with shaft 54. Because of the interengagement of sun gear 60 and planet gear 62, shaft 58 will spin around on its own axis while at the same time orbiting around shaft 54. As shown in FIG. 1, one or more orbit counterweights 43 are preferably carried by counterweight arms 45. Arms 45 are secured to angled arm 56 for orbiting rotation therewith.

Referring now to FIG. 2, paint container 22 has a generally square or rectangular body 66, with a threaded lid 68. One corner of container 22 has a handle 70 integrally formed therein forming an aperture or void 72. Because of handle 70 and aperture 72, container 22 does not have a symmetrically distributed inertia with respect to the central axis 24 of container 22. Because of this eccentric inertial load, when container 22 (full of paint) is mixed using paint mixer 20, an unbalanced load will occur, which, if unchecked, will cause severe vibration sufficient to drive mixer 20 to "walk" or move laterally on the surface on which it rests.

Figure 10:
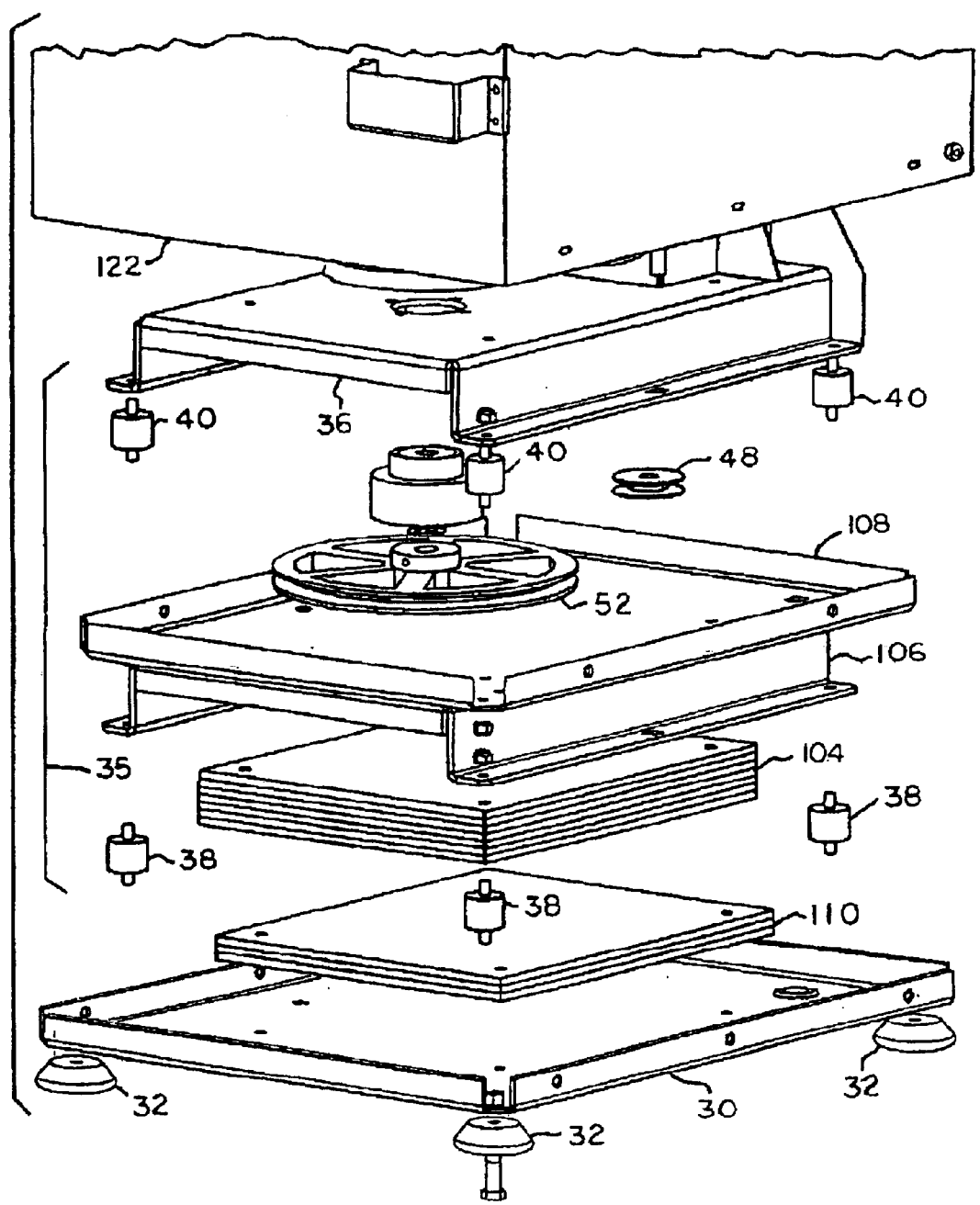
FIG. 10 is an exploded view of parts from FIG. 1, showing details of an alternative embodiment of the intermediate frame assembly and the first and second vibration isolation systems of the present invention.

The present invention overcomes this effect by reducing the amount of vibration transmitted from the container 20 back through driving mechanism 42 to the base 30 and exterior of mixer 20. This result is accomplished by the addition of the intermediate frame 34 (shown in FIGS. 1 and 3) along with the first and second vibration isolating systems, each having one of two sets of vibration isolators 38 and 40. Each vibration isolating system may include additional weights such as weights 104 or 110 (shown in FIG. 10). The intermediate frame 34 is preferably formed of steel, but may be formed of another rigid material. As may be seen in an alternative embodiment shown in FIG. 10, an intermediate frame assembly 35 may be made up of several sheet metal or other rigid components. The sets or plurality of vibration isolators 38, 40 are made up of individual conventional, commonly available damping isolators of the type having metal fasteners at each end of an elastomer core. The paint mixer of the present invention is based on and uses the parts from a model 5300 paint mixer available from the assignee of the present invention, with the addition of the intermediate frame assembly 35, first and second vibration isolation systems, and the paint container holder subassembly 28. It is to be understood that in the embodiment shown in FIGS. 1 and 3, the intermediate frame assembly 35 is made up of the intermediate frame 34 and isolators 38 and 40. In this embodiment, it is to be understood that frame 34 is sized to have a desired mass to serve as a damping weight, as will be described infra. In the second embodiment, shown in FIG. 10, the intermediate frame assembly 35 includes the isolators 38 and 40 and an added set of weights 104, along with sheet metal folded components 106 and 108. Sheet metal component 106 is preferably identical to mixing frame 36, and component 108 is preferably similar to base frame 30, except smaller in length and width. Component 108 provides for a sufficient area to receive and secure mixing frame 26. FIG. 10 also shows additional weights 110 which are secured to base 30 by conventional means. Finally, FIG. 10 also shows a fragmentary view of an outer sheet metal housing 112 which preferably encloses the paint mixing apparatus 20.

It is to be understood that the first vibration isolation system includes damping isolators 40, each having a predetermined spring rate, and a mass which is the total of the mass of the intermediate frame components and any added weights 104. The second vibration isolation system includes damping isolators 38 and the mass of the base components, including any added weights 110.

Figure 4:
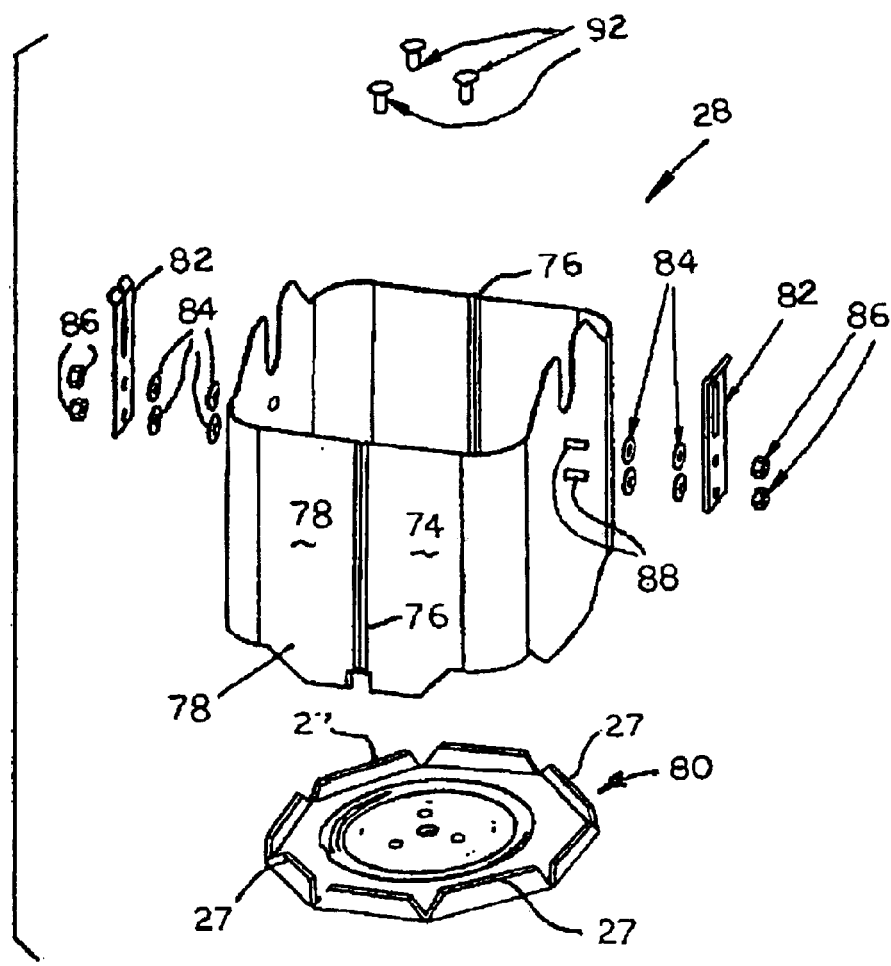
FIG. 4 is an exploded perspective view of a rectangular can holder useful in the practice of the present invention.
Figure 5:
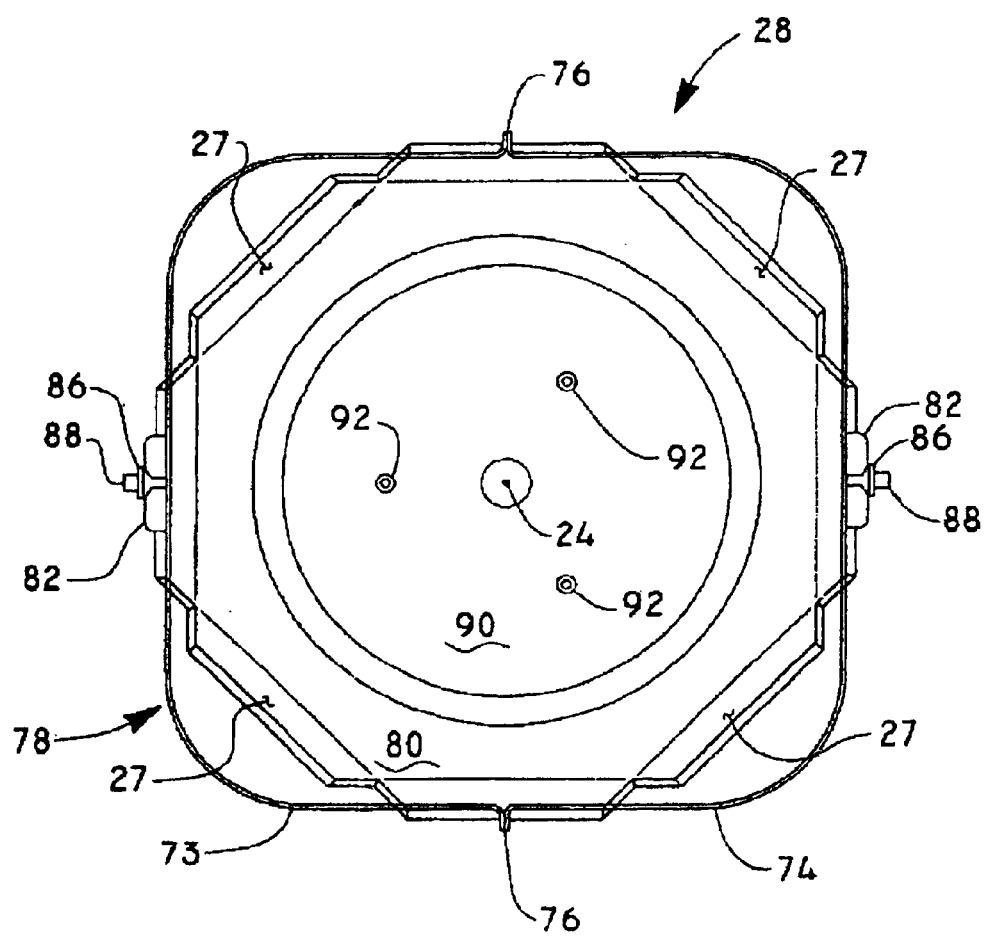
FIG. 5 is a top view of the rectangular can holder of FIG. 4.
Figure 9:
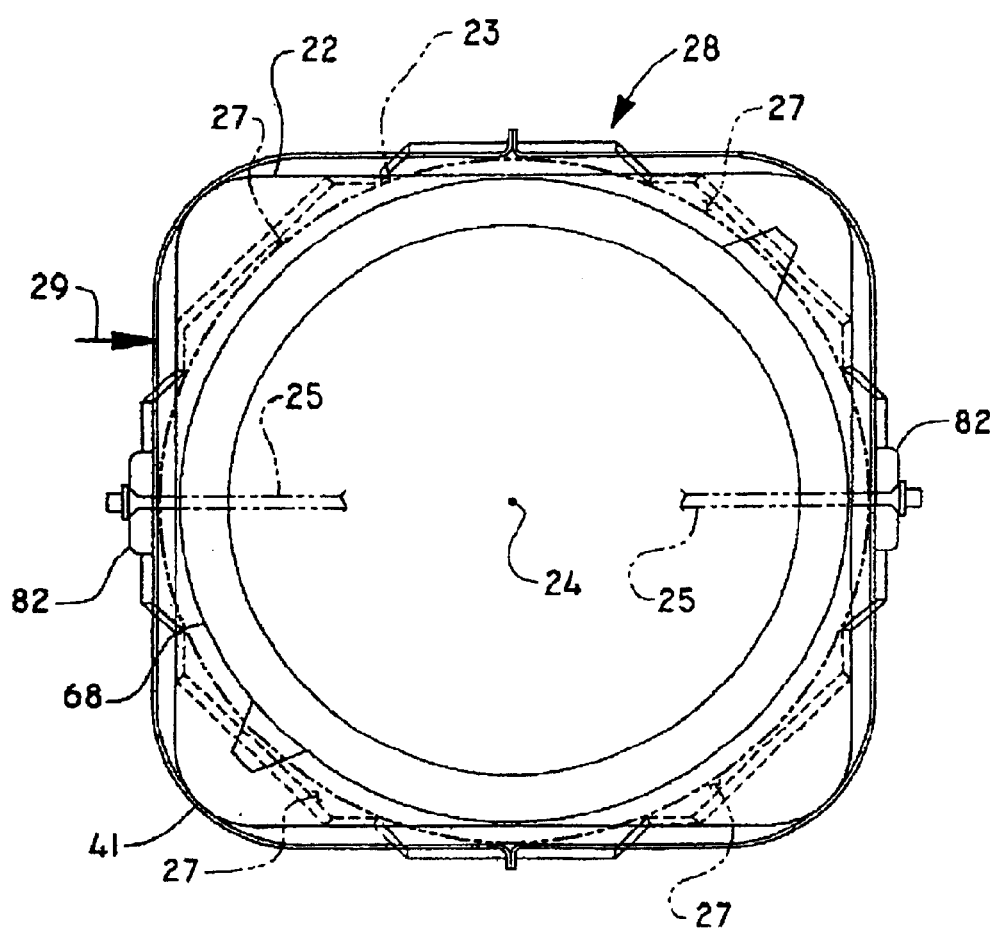
FIG. 9 is a top plan view of the holder of the present invention showing a rectangular paint container in solid lines and a cylindrical paint container in phantom lines.

Referring now also to FIGS. 4, 5 and 9, details of the paint container holder subassembly 28 may be seen. Subassembly 28 has a pair of sheet metal sides 73, 74 welded together along seams 76 to form a unitary assembly 78. A lower plate 80 is welded to the assembly 78. A pair of spring tabs 82 are secured to assembly 78 using washers 84 and locknuts 86 received on threaded bosses 88. Spring tabs 82 receive the wire bail when a cylindrical paint container is placed in holder 28, to prevent the paint container from slipping within holder 28 when holder 28 spins about axis 24. Subassembly 28 is secured to the paint container holder support 64, preferably using screws 92. In FIG. 9, the rectangular or square paint container 22 is shown in solid lines, and a cylindrical paint container 23 is shown in chain lines. The wire bail 25 of the cylindrical paint container 23 is held by clips 82 to locate the top of paint container 23. Four upturned edges 27 formed in lower plate 80 locate the bottom of paint container 23. When the cylindrical paint container is located by clips 82 and edges 27, the paint container will be positioned in holder 28 to position a center of gravity or center of mass of the cylindrical container 23 at axis 24. Axis 24 is coincident with a center of geometry 33 for the rectangular paint container 22. However, it is to be understood that a center of gravity for the non-cylindrical paint container 22 is not located at axis 24. The offset between the center of gravity and center of geometry of container 22 arises because of the void 72 created by handle 70 in container 22. Container 22 rests on top of edges 27, and is positioned within holder 28 by contact between the holder 28 and container 22 at their respective corners, to maintain alignment of container 22 in holder 28. It is to be understood that the handle 70 of container 22 may be placed in any of the corners of holder 28 (for example, corner 41), and the intermediate damping frame assembly 35 of the present invention will compensate for the eccentric load occasioned by container 22.

Figure 6:
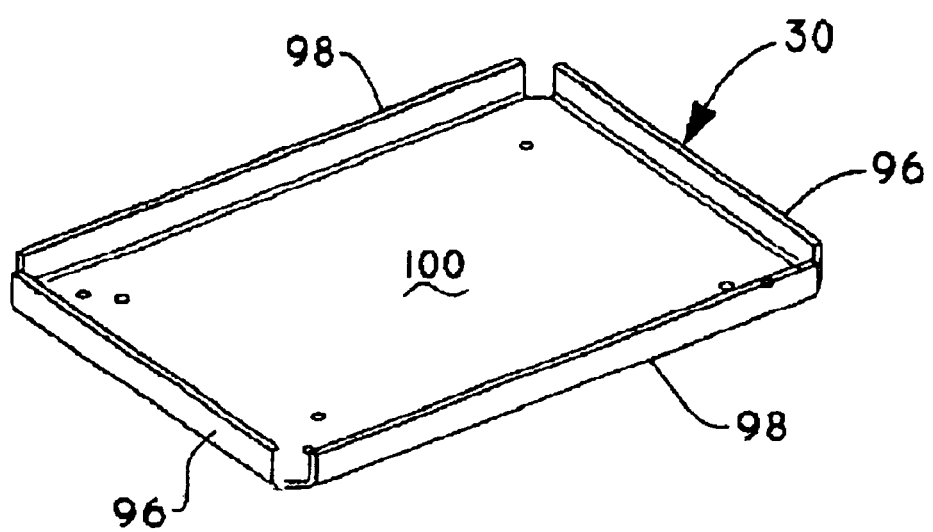
FIG. 6 is a perspective view of the base of the paint mixing apparatus of FIG. 1.

Referring now most particularly to FIG. 6, a perspective view of the base 30 may be seen. Base 30 is formed of sheet metal or other rigid material with edges 96 and 98 formed at 90 degrees and preferably extending up from the upper surface of a planar portion 100 of base 30. In addition, planar portion 100 has apertures 102 for mounting feet 32, and apertures 104 for mounting isolators 40.

The mixer 20 of the present invention provides a vortex mixing motion by tipping the paint container at an angle from the vertical and spinning the paint container about the central axis 24 through the paint container, while at the same time rotating the container about the vertical axis 26 in an orbiting motion. The paint thus undergoes both a spinning and an orbiting motion. However, the aperture or void 72 in paint container 22 that is molded into one corner of the paint container as a handle also causes an unbalanced load. With the unbalanced load in the vortex mixer 20, the vibration increase must be damped. Without the present invention, such vibration will transmit itself to the base 30, causing an intermittent side load. If the intermittent side load exceeds the static friction retaining force between the feet 32 and the surface on which mixer 20 rests, the mixer 20 will move laterally as a result of the intermittent side load.

To reduce unwanted motion of mixer 20, it is desirable to increase isolation of intermittent loads from the base 30. Factors that affect vibration transmission include: the natural frequency of the system, the magnitude of the forcing frequency, and the rate of the forcing frequency. The natural frequency of the system is determined by the mass of the system, and the spring rate of the isolators 38, 40. The magnitude of the forcing frequency is a function of the mass of the one gallon paint container and the speed at which it spins about axis 24 and the speed at which it orbits axis 26.

The rate of the forcing frequency is equal to the lower of the spin and orbit speeds. The vortex mixer 20 preferred for the practice of the present invention has an orbit speed which is lower than the spin speed. Common practice to achieve 80% vibration isolation is to keep the frequency ratio equal to or greater than 2.5. The frequency ratio (FR) equals the forcing frequency ($f_f$) divided by the natural frequency of the system ($f_n$).

$$FR = f_f/f_n \quad (1)$$

In the present invention, it is desirable to use the spin and orbit speeds that have been effective for mixing paint in cylindrical containers. Hence the forcing frequency (in Hertz) will be $$f_f = RPM/60 \quad (2)$$

where the speed in RPM is divided by 60 to convert from minutes to seconds. To get 80% isolation (20% transmissibility, T), the natural frequency will need to be:

$$f_n = f_f[1/(1/T+1)]^{1/2} \text{ or } f_n = f_f/2.45 \text{ for } T = 20\% \quad (3)$$

This gives a desired natural frequency based on the orbit speed of the mixer 20. In order to reduce the natural frequency of the system, either the mass of the system must be increased or the spring rate of the isolators must be reduced, or both. The present invention utilizes two sets 38, 40 of four isolators mounted in series, with the intermediate frame 34 located between set 38 and set 40. Preferably damping weight 104 is added to the intermediate frame 34 and the base 30, balancing the dynamic deflection of isolator set 40 with the deflection of isolator set 38, thus reducing the vibration transmitted to base 30 which must be accommodated by feet 32, which are also elastomer damping isolator members acting between the base 30 and the surface on which mixer 20 rests.

The desired static deflection in inches is given by $$d_s = 9.8/(f_n)^2 \quad (4)$$

The spring rate for the system is given by $$K_{sys} = W/d_s \quad (5)$$

where W is the weight in pounds and $d_s$ is the system deflection in inches.

The isolation system of the present invention thus may be seen to include three frames, the base 30, the intermediate frame 34 (or the intermediate frame assembly 35), and the mixing frame 36, with the intermediate and base frames weighted to work with feet 32 and isolators 38 and 40 to act as a vibration damping system to reduce the vibration transmission to the base 30. The isolators 38 and 40 are sized to provide compression and shear loading characteristics as desired. In addition the isolators 38 and 40 each have selected durometer values to act as vibration dampers. By balancing the system as described, the intermediate frame 34 (or assembly 35) acts as a damper driving the frequency ratio of the system high enough so the mixer 20 will not "walk" or move transversely on typical surfaces upon which it is placed.

This invention is not to be taken as limited to all of the details thereof as modifications and variations thereof may be made without departing from the spirit or scope of the invention.

What is claimed is:

1. An improvement for vortex motion paint mixing machines of the type having a paint container holder spinning about its own axis and orbiting about a second axis positioned at an angle to the container axis, where the machine includes a base and a paint mixing apparatus having a drive mechanism to spin and orbit the paint container, the improvement in combination with the paint mixing machine comprising an intermediate frame assembly located between the mixing apparatus and the base and secured therebetween by a plurality of vibration isolators forming a first isolation system and a second vibration isolation system with the first vibration isolation system located between the mixing apparatus and the intermediate frame assembly, and the second vibration isolation system located between the intermediate frame assembly and the base, the improvement further comprising an additional mass located at one of the intermediate frame and the base or at both sufficient to reduce vibration of the paint mixing machine.

2. The improved paint mixing apparatus of claim 1 wherein the additional mass is at the intermediate frame assembly.

3. The improved paint mixing machine of claim 1 wherein the paint container holder has a non-cylindrical paint container receiving aperture.

4. The improved paint mixing machine of claim 1 wherein the paint container holder has a generally rectangular paint container receiving aperture.

5. The improved paint mixing machine of claim 4 wherein the aperture of the paint container holder has unequal sides.

6. The improved paint mixing machine of claim 1 wherein the paint container holder has a square paint container receiving aperture.

7. The improved paint mixing machine of claim 1 wherein the paint container holder has a generally rectangular shaped paint container receiving aperture sized to receive and support either a cylindrical paint container or a rectangular paint container for mixing.

8. The improved paint mixing machine of claim 1 wherein the additional mass is at the base.

9. The improved paint mixing machine of claim 1 wherein the first vibration isolators system comprises a first plurality of damping isolators, each damping isolator having a predetermined spring rate.

10. The improved paint mixing machine of claim 9 wherein the second vibration isolators comprises a second plurality of damping isolators, each damping isolator having a predetermined spring rate.

11. The improved paint mixing machine of claim 10 wherein the isolators of the second plurality of damping isolators each have the same spring rate.

12. The improved paint mixing machine of claim 9 wherein the isolators of the first plurality of damping isolators each have the same spring rate.

13. A method of damping vibration in a paint mixing machine of the type capable of mixing paint in cylindrical or non-cylindrical containers, the method comprising:
   a. providing a receptacle for receiving one of a cylindrical and non-cylindrical paint container on a mixing apparatus;
   b. driving the receptacle with:
      i. a spinning motion about an axis of the receptacle, and
      ii. an orbiting motion about an axis separate from the axis of the receptacle;
   c. providing an intermediate frame between the mixing apparatus and a base;
   d. damping vibration between the intermediate frame and the mixing apparatus by a first vibration isolation system located between the mixing apparatus and the intermediate frame, e. damping vibration between the intermediate frame and the base by a second vibration isolation system located between the intermediate frame and the base, and f. adjusting a mass of at least one of the intermediate frame and the base such that vibration in the base caused by the paint container is reduced by the intermediate frame and the first and second vibration isolation systems.

14. The method of claim 13 wherein the first vibration isolation system comprises a first predetermined mass located at the intermediate frame and a first plurality of damping isolators connected between the intermediate frame and the mixing apparatus, with each isolator having a predetermined spring rate.

15. The method of claim 13 wherein the second vibration isolation system comprises a second predetermined mass located at the base and a second plurality of vibration isolators connected between the intermediate frame and the base, with each isolator having a predetermined spring rate.

16. The method of claim 13 wherein step f further comprises adjusting the mass at the intermediate frame until a deflection of the first and second vibration isolation systems are substantially equal.

17. The method of claim 16 wherein step f further comprises adding weight to the intermediate frame.

18. The method of claim 16 wherein step f further comprises adjusting the mass at the base until a deflection of the first and second vibration isolation systems are substantially equal.

19. The method of claim 18 wherein step f further comprises adding weight to the base.

20. The method of claim 13 wherein step a further comprises arranging the receptacle to spin about a center of gravity for the cylindrical paint container.

21. The method of claim 13 wherein step a further comprises arranging the receptacle to spin about a center of geometry of both the cylindrical and non-cylindrical paint containers.

* * * * *

UNITED STATES PATENT AND TRADEMARK OFFICE
CERTIFICATE OF CORRECTION

PATENT NO. : 6,953,279 B2
DATED : October 11, 2005
INVENTOR(S) : Thomas J. Midas et al.

It is certified that error appears in the above-identified patent and that said Letters Patent is hereby corrected as shown below:

Title page,
Item [56], References Cited, OTHER PUBLICATIONS,
"Technical Section: Vibration and Shock:" reference, delete "www.tpedayton.com" and insert -- www.tpcdayton.com --.
"Figures relating to Vibration and Shock:" reference, delete "http:./" and insert -- http:// -- and delete "www.tpedayton.com" and insert -- www.tpcdayton.com --.

Column 6,
Line 40, delete "isolators" and insert -- isolation --.
Line 44, delete "isolators" and insert -- isolation system --.

Signed and Sealed this

Tenth Day of January, 2006

JON W. DUDAS
*Director of the United States Patent and Trademark Office*